June 6, 1933.  C. M. TUTTLE ET AL  1,912,740
APPARATUS FOR PHOTOGRAPHIC PRINTING
Original Filed Jan. 19, 1929    2 Sheets-Sheet 1
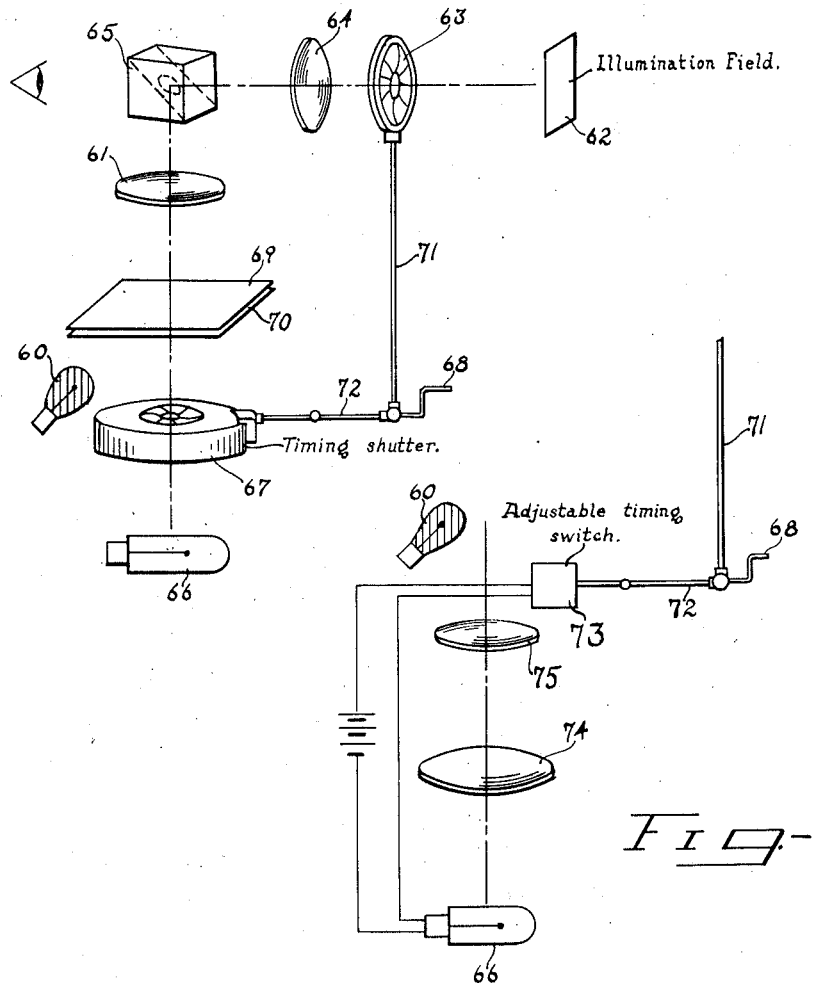
INVENTORS
CLIFTON M. TUTTLE
JOHN W. McFARLANE
BY HERBERT E. WHITE
ATTORNEY

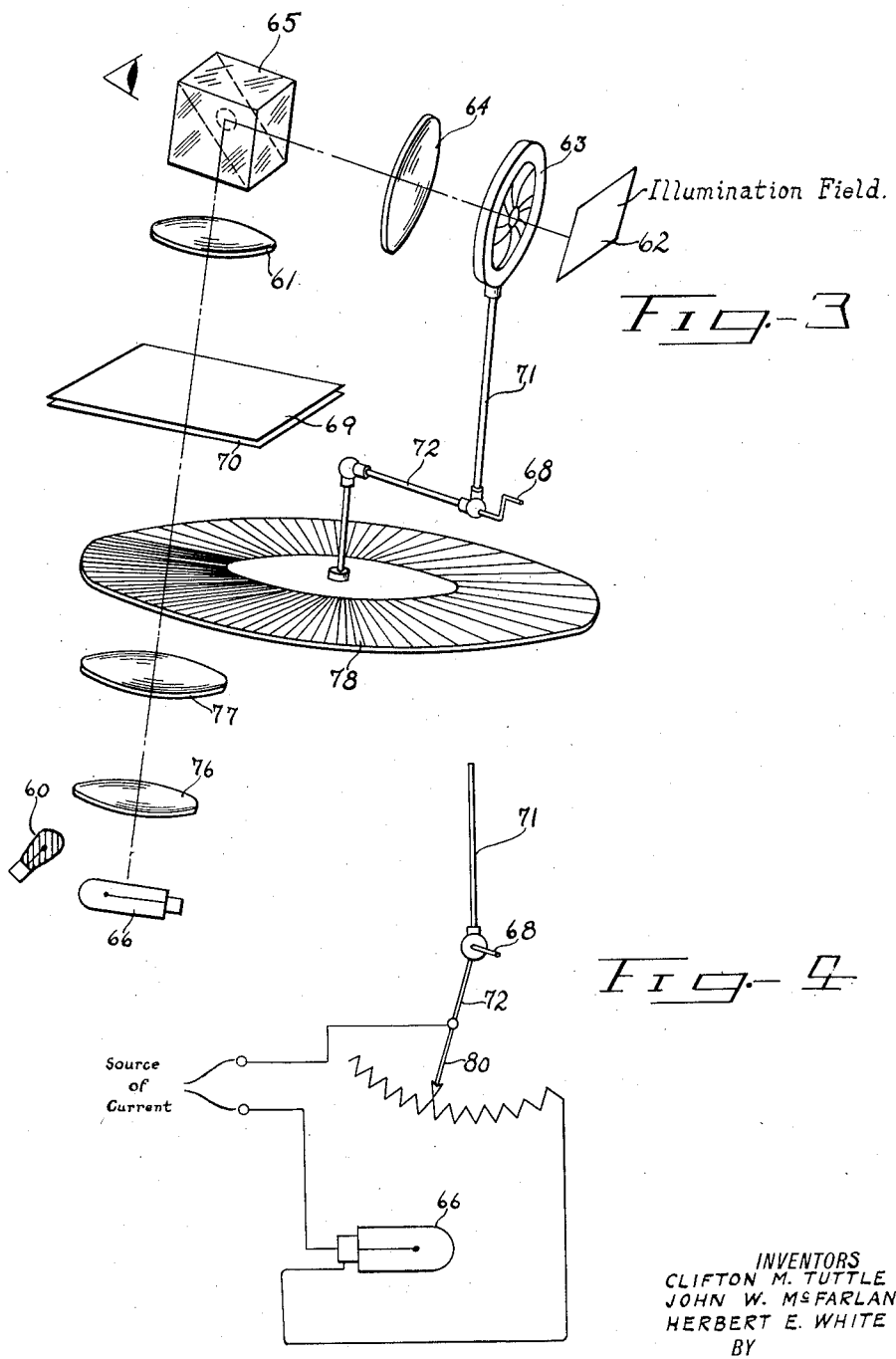

Patented June 6, 1933

1,912,740

UNITED STATES PATENT OFFICE

CLIFTON M. TUTTLE AND JOHN W. McFARLANE, OF ROCHESTER, AND HERBERT E. WHITE, OF YONKERS, NEW YORK, ASSIGNORS TO EASTMAN KODAK COMPANY, OF ROCHESTER, NEW YORK, A CORPORATION OF NEW YORK

APPARATUS FOR PHOTOGRAPHIC PRINTING

Original application filed January 19, 1929, Serial No. 372,083. Divided and this application filed February 20, 1932. Serial No. 594,405.

Our invention relates to light control for photographic apparatus and particularly to a method and apparatus for accurately giving automatic regulation of light quantities.

This application is a division of our application Serial Number 372,083 filed June 19, 1929.

It has been the usual practice in the making of prints from negatives to rely entirely on the judgment of the operator, that is, the operator when making a print of a negative observes the character of the negative and then guesses at the amount of light or time of exposure for the print. This has resulted in a high wastage of time and material and frequently the operator retained prints which did not bring out the best results possible from the negatives.

One of the objects therefore of our invention is to provide a device in which either the time or intensity of the exposure of a print or both are manually or automatically controlled so that uniform results are always obtained. It is an additional object of the invention to substitute a measurement of the total light transmission of a negative for the guess of the printing expert in assigning a printing exposure. A further object is to provide means whereby the measurement of the total light transmission controls means to regulate the printing exposure automatically. A still further object is to provide means controlled by the establishing of a visual intensity match with the total transmission of the negative to govern either the intensity or time of the printing exposure.

In one of its phases the invention utilizes the light transmitted by the negative or by a limited region of the negative to illuminate one portion of a photometric field while the other portion of the field is brought to a visual match by adjusting the intensity of a comparison light source used to illuminate the other portion of the photometric field and causing this adjustment to effect the proper printing control.

Figures 1, 2, 3, and 4 are schematic showings of different types of manually controlled printers in which an optical match determines the printing.

Figures 1 and 2 employ fixed intensity and variable time while the arrangements of Figures 3 and 4 employ fixed printing time and variable intensity.

In the arrangement shown in Fig. 1 there is provided a source of non-actinic light 60 positioned to transmit light through the sensitized material 69 and negative 70 and thence through a lens 61 where it is incident on a photometric cube 65 preferably a Lummer-Brodhum cube. The sensitized material 69 such as printing paper diffuses the light from the source 60 so that one portion of the cube is illuminated. There is also provided a comparison source of light 62 which passes through an adjustable iris diaphragm 63 and the lens 64 to the photometric cube 65. There is also provided a source of printing light 66 incident on a timing shutter 67 of the type used in cameras. The diaphragm 63 and the shutter 67 are inter-related by mechanical control represented by arms 71 and 72 actuated by the handle 68 so that adjustment of the diaphragm 63 controls the shutter to effect the proper time exposure of the negative.

The adjustment of the diaphragm 63 and the shutter 67 is determined by matching the two fields of illumination on the photometric cube from the source of non-actinic light 60 and the comparison source of light 62. When the diaphragm 63 has been adjusted so these two fields of illumination are matched the timing shutter 67 is properly adjusted to effect the correct printing exposure. The shutter 67 may then be manually tripped whereupon light from the printing source 66 is incident on the negative and sensitive material for the proper time as indicated by the total light transmission of the negative measured by the comparison of the field of illumination in the photometric cube 65.

Instead of using the timing shutter 67 as shown in Figure 1 an electric timing switch 73 as shown in Figure 2 may be substituted so that when the handle 68 is actuated to adjust the arm 71 controlling the iris diaphragm 63 to obtain a photometric match of the field of illumination, arm 72 adjusts the electrical timing switch 73 to close the circuit for the printing light source 66 for the correct time interval to properly print the negative. Lens 74 and 75 may be used to concentrate the light on the sensitized material 69 and the negative 70. The adjustable timing switch 73 may be of any well known structure which has a movable element adjustable to close the circuit of the lamp 66 for a predetermined interval of time.

In the arrangement shown in Figures 1 and 2 the illumination from the printing source is fixed while the printing time is made variable in the course of obtaining the total transmission of the negative by the photometric match. In the modification shown in Figure 3 the printing time remains fixed while the illumination incident on the negative 70 and sensitized material 69 is adjustable. In this arrangement also a source of comparison light 62 and adjustable iris diaphragm 63 together with a lens 64 control the illumination of one field of the photometric cube 65. A source of non-actinic light 60 is imaged by the lenses 76 and 77 through the variable optical density wedge 78 and thence through the negative 70 the sensitized material 69 and lens 61 to illuminate the other portion of the photometric field. In this instance also the turning of the handle 68 by means of the arm 71 adjusts the aperture in the iris diaphragm 63 until the two fields of illumination in the photometric cube 65 from the source of light 62 and the non-actinic source 60 are equal. This adjustment of the handle 68 through the arm 72 adjusts the optical density wedge 78 to control the amount of light incident on the negative and the sensitized material. The printing light 66 is then lighted for a fixed interval and since the photometric match in the cube 65 has determined the total transmission of the negative and the sensitized material the optical wedge 78 governs the printing of the negative under properly controlled conditions.

The arrangement shown in Figure 3 may be modified as shown in Figure 4, by substituting for the optical density wedge 78 a variable rheostat 80 simultaneously controlled through the arm 72 by the adjustment of handle 68 at the time when arm 71 is adjusting the diaphragm 63 to obtain a photometric match in the photometric cube 65.

The structural details have been omitted from the showing of the various modifications of the invention since it was believed that their inclusion would complicate the disclosure of the invention. It will be understood that these devices are properly housed to exclude foreign light and that various details of adjustment may be provided which will be readily understood by those skilled in this art. When we refer herein to a negative we mean thereby any image-bearing record whether made by photographic or other processes from which a copy is to be made.

We consider as included within our invention each of the processes and apparatus herein disclosed. We further contemplate as a part of our invention all such modifications and equivalents as fall within the scope of the appended claims.

What we claim as new and desire to secure by Letters Patent of the United States, is:

1. In photographic printing apparatus, an automatic shutter having an adjustable timing device, a separate source of illumination, means for comprising light transmitted by a negative with said source, diaphragming means associated with said source and means for adjusting in assembly said timing device and said diaphragming means.

2. Photographic printing apparatus including a shutter adjustable for speed between a printing light and a negative and positive to be printed, a photometric cube, a source of non-actinic light for illuminating a portion of the cube through the negative and positive, a second light source for illuminating another portion of the cube, an adjustable light varying means between the second source and said cube and means for simultaneously adjusting said light varying means and the speed of said shutter.

3. A photographic printer comprising means for supporting a negative and a sensitized sheet, an adjustable timing device, a source of non-actinic light mounted to cast a beam through a negative and a sensitized sheet supported in the printer, means for determining the photometric value of the beam transmitted by said negative and said sensitized sheet and means controlled by said determining means for adjusting said timing device.

4. In apparatus for printing a sensitized layer from a photographic record, a light source, means for transmitting non-actinic light from said source through said record and said layer, a second source of light, adjustable means for varying the light from said second source to match the non-actinic light transmitted by said record and said layer, an exposure controlling means, means controlled by said adjustable means for setting the exposure controlling means and means for exposing said sensitized layer in accordance with the setting of said exposure controlling means.

5. Photographic apparatus for printing a sensitized layer through a photographic record for a fixed time interval including apparatus for predetermining the proper printing intensity comprising means for transmitting to said record a beam of non-actinic light of known intensity, means for determining the photometric value of the non-actinic light transmitted by said record, an adjustable light modifying device and means controlled by said photometric determining means for adjusting said light modifying device.

Signed at Rochester, New York, this 28th day of January 1932.

CLIFTON M. TUTTLE.
   JOHN W. McFARLANE.
   HERBERT E. WHITE.

CERTIFICATE OF CORRECTION.

Patent No. 1,912,740.     June 6, 1933.

CLIFTON M. TUTTLE, ET AL.

It is hereby certified that error appears in the printed specification of the above numbered patent requiring correction as follows: Page 2, line 79, claim 1, for "comprising" read "comparing"; and that the said Letters Patent should be read with this correction therein that the same may conform to the record of the case in the Patent Office.

Signed and sealed this 8th day of August, A. D. 1933.

M. J. Moore.

(Seal)             Acting Commissioner of Patents.